United States Patent
Jarsch et al.

(10) Patent No.: US 12,269,121 B2
(45) Date of Patent: Apr. 8, 2025

(54) APPARATUS FOR INTRODUCING A PARTING AGENT INTO A HOLLOW WORKPIECE, LOADING STATION, SYSTEM AND METHOD

(71) Applicant: TRUMPF WERKZEUGMASCHINEN SE + CO. KG, Ditzingen (DE)

(72) Inventors: Florian Jarsch, Ditzingen (DE); Karsten Ruetz, Ludwigsburg (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 656 days.

(21) Appl. No.: 17/479,110

(22) Filed: Sep. 20, 2021

(65) Prior Publication Data

US 2022/0055152 A1 Feb. 24, 2022

Related U.S. Application Data

(63) Continuation of application No. PCT/EP2020/056677, filed on Mar. 12, 2020.

(30) Foreign Application Priority Data

Mar. 18, 2019 (DE) .......................... 102019106847.9

(51) Int. Cl.
| | |
|---|---|
| B23K 26/14 | (2014.01) |
| B23K 26/142 | (2014.01) |
| B23K 26/146 | (2014.01) |
| B23K 26/38 | (2014.01) |
| B23K 101/06 | (2006.01) |

(52) U.S. Cl.
CPC .......... *B23K 26/147* (2013.01); *B23K 26/142* (2015.10); *B23K 26/146* (2015.10); *B23K 26/38* (2013.01); *B23K 2101/06* (2018.08)

(58) Field of Classification Search
CPC .... B23K 26/147; B23K 26/146; B23K 26/38; B23K 26/142; B23K 26/16; B23K 2101/06
See application file for complete search history.

(56) References Cited

U.S. PATENT DOCUMENTS

| | | | |
|---|---|---|---|
| 1,850,481 | A | 3/1932 | Telfer |
| 2,520,397 | A | 8/1950 | Green |
| 5,073,694 | A | 10/1991 | Tessier et al. |
| 6,110,526 | A | 8/2000 | Nussbaumer et al. |

(Continued)

FOREIGN PATENT DOCUMENTS

| | | |
|---|---|---|
| CA | 2696817 A1 | 3/2008 |
| CN | 1143544 A | 2/1997 |

(Continued)

*Primary Examiner* — Thien S Tran
(74) *Attorney, Agent, or Firm* — Laurence A. Greenberg; Werner H. Stemer; Ralph E. Locher (57) ABSTRACT

An apparatus for introducing a parting agent into a hollow workpiece before or during processing of the hollow workpiece by using a laser processing machine, includes an introduction section with a nozzle for dispensing the parting agent and a centering element which is disposed on the introduction section and serves for centering the introduction section within the hollow workpiece. A loading station, a system and a method are also provided.

15 Claims, 11 Drawing Sheets

(56) References Cited

U.S. PATENT DOCUMENTS

| | | | |
|---|---|---|---|
| 7,321,104 | B2 | 1/2008 | Wessner |
| 2004/0232120 | A1 * | 11/2004 | Wessner ............. B23K 26/1494 |
| | | | 219/121.72 |
| 2013/0020290 | A1 | 1/2013 | Epperlein |
| 2013/0020295 | A1 * | 1/2013 | Schopf ................... B23K 26/38 |
| | | | 219/121.72 |

FOREIGN PATENT DOCUMENTS

| | | | | |
|---|---|---|---|---|
| CN | 204329828 U | | 5/2015 | |
| DE | 7531621 U | | 1/1976 | |
| DE | 9201827 U1 | | 5/1992 | |
| DE | 102007052945 B3 | | 7/2009 | |
| DE | 102010003282 A1 | | 9/2011 | |
| DE | 102011015493 A1 | * | 10/2012 | ......... B05B 13/0627 |
| DE | 102015110383 A1 | | 12/2016 | |
| EP | 1454700 B1 | | 5/2006 | |
| EP | 2548692 A1 | | 1/2013 | |
| JP | 62183985 A | | 8/1987 | |
| JP | H0671472 A | | 3/1994 | |
| JP | H0890351 A | * | 9/1994 | |
| JP | 11090661 A | | 4/1999 | |
| JP | 2007075878 A | | 3/2007 | |
| JP | 2010110775 A | | 5/2010 | |
| JP | 2012115907 A | * | 6/2012 | |
| JP | 5014311 B2 | * | 8/2012 | |
| WO | 2009059776 A1 | | 5/2009 | |

\* cited by examiner

APPARATUS FOR INTRODUCING A PARTING AGENT INTO A HOLLOW WORKPIECE, LOADING STATION, SYSTEM AND METHOD

CROSS-REFERENCE TO RELATED APPLICATION

This application is a continuation, under 35 U.S.C. § 120, of copending International Application PCT/EP2020/056677, filed Mar. 12, 2020, which designated the United States; this application also claims the priority, under 35 U.S.C. § 119, of German Patent Application DE 10 2019 106 847.9, filed Mar. 18, 2019; the prior applications are herewith incorporated by reference in their entirety.

FIELD AND BACKGROUND OF THE INVENTION

The invention relates to an apparatus for introducing a parting agent into a hollow workpiece before or while the workpiece is processed by using a laser processing machine. The invention furthermore relates to an associated loading station, an associated system and an associated method.

During the laser processing, in particular the laser cutting, of hollow workpieces, for example of pipes, cutting fragments produced in the processing operation accumulate on the inside of the workpiece, in particular the inside of the pipe. Those contaminants on the inside of the workpiece can be removed only in a relatively difficult, cumbersome and expensive manner by follow-up cleaning.

Through the use of parting agents, the adhesion of cutting fragments can be reduced, and easier, faster and less expensive follow-up cleaning of the workpieces can be made possible. The conventional introduction of the parting agent "by hand" is however time-consuming, and the laser processing machine can furthermore become significantly contaminated. In that case, the parting agent is generally introduced by hand, using a spraying apparatus, into the workpiece that has already been clamped on the laser processing machine. In order to ensure in that case that sufficient parting agent is applied, it is generally the case that far too great a quantity of parting agent is introduced. In that case, excess parting agent may partially run out of the workpiece into the laser processing machine, or be extracted by suction by using a suction-extraction apparatus. In that case, parts of the laser processing machine, such as the suction-extraction apparatus, waste disposal device and feed station, can be contaminated by the parting agent. The contamination can lead to not inconsiderable consequential damage. Furthermore, for the processing of a workpiece, it is generally necessary for the parting agent to be introduced multiple times during the processing operation. For the introduction of the parting agent, the laser processing machine must be stopped, and the protective cabin must be opened. That results in a loss of productivity and in a more extensive risk of contamination of and damage to the laser processing machine.

International Publication WO 2009/059776 A1 has duly made a first proposal for the introduction of parting agent into a workpiece. That proposal however cannot be used economically, and it is technically cumbersome and difficult to position the nozzle of the apparatus for dispensing the parting agent that is disclosed in that document in a workpiece. In that respect, it also remains the case at present that parting agent is introduced into workpieces manually prior to the laser processing operation.

SUMMARY OF THE INVENTION

It is accordingly an object of the invention to provide an apparatus for introducing a parting agent into a hollow workpiece, a loading station, a system and a method, which overcome the hereinafore-mentioned disadvantages of the heretofore-known apparatuses, stations, systems and methods of this general type.

With the foregoing and other objects in view there is provided, in accordance with the invention, an apparatus for introducing a parting agent into a hollow workpiece before or while the workpiece is processed by using a laser processing machine. Here, the apparatus comprises an introduction section with a nozzle for dispensing the parting agent and a centering element which is disposed on the introduction section and which serves for centering the introduction section within the hollow workpiece.

The centering element serves in particular for holding the introduction section in a defined manner in a central region of the hollow workpiece. Uniform wetting of the inside of the workpiece can thus be ensured. The parting agent can be introduced into the workpiece in targeted fashion, and in particular with the minimum required quantity of parting agent. Contamination of the laser processing machine can thus be substantially or even entirely avoided. Here, it is possible in particular for the parting agent to be introduced into the workpiece prior to the laser processing operation. The introduction process can accordingly in particular take place outside the primary processing time of the laser processing machine, in such a way that, altogether, the productivity of the laser processing machine is not influenced or is influenced only insignificantly. The centering element may in particular be configured in such a way that not only round pipes, for example, but also hollow workpieces of other shapes, for example rectangular pipes, can be wetted with parting agent, wherein the centering element holds the introduction section and in particular the nozzle of the introduction section in a centered manner in the respective workpiece. Here, the nozzle may in particular be in the form of an annular jet nozzle, in such a way that, by using compressed air, parting agent can be sprayed uniformly and in finely atomized form onto the inside of the workpiece. Here, through the use of the nozzle, it is possible in particular for the degree of atomization and/or the volume flow to be adapted in accordance with workpiece geometry and other requirements.

One advantageous refinement of the invention provides for the centering element to include a number of centering brush fibers. Through the use of such centering brush fibers, it is possible in particular to provide that the introduction section, or in particular the nozzle of the introduction section, is held in a centered manner in the case of a wide variety of different workpiece inside geometries. For example, centering can be provided in the case of round and rectangular pipes of different diameters. By virtue of the fact that the centering brush fibers may in particular be of elastically deformable form, they can adapt to different workpiece geometries, in particular to different workpiece inside diameters. Here, the centering brush fibers may be disposed on a brush body. The brush body may in turn be disposed on the introduction section in front of the nozzle in an introduction direction. Here, the centering brush fibers may be disposed over the outer circumference of the introduction section. For example, an arrangement of three centering brush fiber bundles at intervals of 120° with respect to one another would be conceivable. However, by way of example, the provision of four centering fiber bundles that are disposed at intervals of 90° with respect to one another would also be conceivable. An arrangement of three centering fiber bundles has proven to be advantageous in particular in the case of circular cylindrical workpiece inside geometries, whereas the provision of four centering fiber bundles has proven to be advantageous in particular in the case of square or rectangular workpiece inside geometries.

Instead of centering fiber bundles, the centering element may also include other configurations, geometries and/or materials, as long as a centering action similar to that of centering fiber bundles can be provided.

A further advantageous configuration of the invention provides that the introduction section includes a guide rod, at the free end of which the nozzle is disposed, wherein the centering element is disposed on the guide rod. Here, the guide rod serves in particular for a reliable introduction of the introduction section into a workpiece. Here, it is in particular conceivable for the centering element to be disposed on the outside of the guide rod. Through the introduction section, it is possible in particular for compressed air and parting agent to be transported to the nozzle, where the parting agent can be released by using the compressed air. It is conceivable for control air for controlling the nozzle to additionally be conducted through the introduction section. In particular, it is consequently possible for two to three fluid lines to be led through the introduction section to the nozzle.

It is also advantageous if, on the guide rod, in addition to the centering element, a stabilization element is provided in order to prevent tilting of the guide rod in the workpiece. Here, the stabilization element may be disposed in front of the centering element, and so as to be spaced apart from the centering element, in an introduction direction. In this way, tilting of the guide rod in the workpiece can be prevented, and its particularly exact positioning of the nozzle can thus be provided. Here, the stabilization element may correspond in terms of construction to the construction of the centering element, and may thus in particular have brush fibers or brush fiber bundles.

It is particularly preferable if an introduction hose with a nozzle for dispensing the parting agent is additionally provided, wherein the introduction hose can be introduced instead of the introduction section into a hollow workpiece. An apparatus which can be used in a particularly flexible manner is thus provided. In particular in the case of small diameters of the inside of the workpiece, it is thus possible in a particularly simple manner for an unrollable hose to also be pushed, instead of the introduction section, into the workpiece. For example, in the case of pipe diameters of 20 mm to 70 mm, the introduction hose can be introduced instead of the introduction section into the workpiece. In the case of such small diameters, it has been found that a hose can be introduced even without the provision of a centering element, and a sufficiently precise and sparing introduction of parting agent is nevertheless possible. In this respect, an apparatus which can be used in a particularly flexible manner is provided, in the case of which either the introduction section with centering element or the introduction hose can be introduced, depending on the diameter of the workpiece.

It is particularly preferable here if that end of the guide rod which is averted from the nozzle is adjoined by an energy chain. The energy chain can stabilize and guide the media supply to the nozzle. It is conceivable here, in particular in the case of relatively long pipes, for the energy chain to bend within the workpiece until the energy chain comes into contact with the inside of the workpiece. By virtue of the fact that a centering element is however provided on the introduction section, it is nevertheless possible for the nozzle to be centered in the workpiece and thus for the inside of the workpiece to be wetted, in particular uniformly, with parting agent.

It is furthermore particularly preferred if a chain drum for the rolling-up of the energy chain is provided. Here, the chain drum may in particular be constructed for the passive rolling-up of the energy chain (for example by using a spring element).

An introduction device with a drive device for introducing the introduction section into the workpiece is advantageously provided. Here, the introduction device may in particular be positioned in front of the workpiece in an introduction direction. Here, the drive device may in particular be in the form of an (electric) motor and may drive a drive roller in order to introduce the introduction section into the workpiece. Here, in order to provide a reliable drive action, at least one bracing roller may be provided above the drive roller. In front of the bracing roller or drive roller in an introduction direction, there may be provided at least one guide roller for guiding the introduction section into the workpiece in a defined manner.

With the objects of the invention in view, there is also provided a loading station for storing hollow workpieces and for loading a laser processing machine with the workpieces. Here, the loading station comprises an apparatus according to the invention for introducing a parting agent into the hollow workpieces before the workpieces are processed by using the laser processing machine. Consequently, the introduction of the parting agent can be performed at the loading station before the workpiece is processed by using the laser processing machine, in such a way that the productivity of the laser processing machine is not impaired.

The loading station preferably has a machine frame and an axially displaceable sliding gauge, wherein the chain drum is disposed in a positionally fixed manner on the machine frame, and wherein the introduction device is disposed on the sliding gauge. Here, the machine frame may have a bundle magazine in which the workpieces can be stored prior to the laser processing operation. A workpiece that has been separated out can thereupon be displaced by the sliding gauge to a defined position, and the length of the workpiece can be determined. The sliding gauge consequently has the function of displacing a separated-out workpiece into a defined position, in particular at a stop, and of measuring the length of the workpiece. The introduction device may be disposed on the sliding gauge, whereas the chain drum may be disposed in a positionally fixed manner on the machine frame. When the sliding gauge is displaced, the energy chain is consequently unwound from the chain drum, and the introduction section fastened to the introduction device is displaced towards the workpiece. The introduction section can thereupon be introduced with the nozzle into the workpiece by using the introduction device.

It would also be conceivable for the loading station to have an axially displaceable sliding gauge, wherein the chain drum and the introduction device are disposed on the sliding gauge. In this case, the chain drum and the introduction device are consequently disposed in displaceable fashion on the sliding gauge.

It would furthermore also be conceivable for the loading station to have a machine frame, wherein the chain drum is disposed in axially displaceable fashion on the machine frame, and wherein the introduction device is disposed on an arm that is coupled in terms of motion to the chain drum. Consequently, in this case, the chain drum and the introduction device are not disposed on the sliding gauge. Rather, the chain drum is disposed axially on the machine frame. The introduction device may be provided on the in particular vertically displaceable arm in order to introduce the introduction section into a workpiece.

With the objects of the invention in view, there is furthermore provided a system for processing hollow workpieces, the system comprising a loading station according to the invention and a laser processing machine for the laser processing of the workpieces. Consequently, a system can be provided in the case of which the wetting with parting agent is performed prior to the laser processing operation, in such a way that the productivity of the laser processing machine is not adversely affected, or is only insignificantly adversely affected.

With the objects of the invention in view, there is concomitantly provided a method for introducing a parting agent into a hollow workpiece before or while the workpiece is processed by using a laser processing machine. The method is carried out by using an apparatus according to the invention and comprises the following steps:
 a. introducing the introduction section for dispensing the parting agent into a hollow workpiece, wherein the centering element centers the introduction section within the workpiece; and
 b. dispensing the parting agent in the workpiece through the nozzle.

Parting agent can consequently be introduced in a defined manner. Here, it can in particular be ensured that only the required quantity of parting agent is introduced into the workpiece, in such a way that contamination, in particular contamination of the laser processing machine, can be substantially avoided.

The method is advantageously carried out by using the system according to the invention, wherein the method includes the further step of:
 c. laser processing, by using the laser processing machine, of the workpiece that has been wetted with parting agent.

The workpiece wetted with parting agent can consequently be subjected to laser processing. During the laser processing operation itself, there is consequently in particular no need for interruption for the purposes of introducing further parting agent, in such a way that a particularly efficient laser processing operation can be provided.

Further details and advantageous configurations of the invention will emerge from the following description, on the basis of which the embodiments of the invention illustrated in the figures are described and discussed in more detail.

Other features which are considered as characteristic for the invention are set forth in the appended claims.

Although the invention is illustrated and described herein as embodied in an apparatus for introducing a parting agent into a hollow workpiece, a loading station, a system and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 4b is a schematic cross-sectional illustration of the embodiment shown in FIG. 4a;

FIG. 4c is a schematic illustration of an introduction device of the apparatus of the loading station as per FIG. 4a;

FIG. 5b is a schematic cross-sectional illustration of the loading station as per FIG. 5a;

FIG. 6b is a schematic cross-sectional illustration of the loading station as per FIG. 6a.

DETAILED DESCRIPTION OF THE INVENTION

Figure 1:
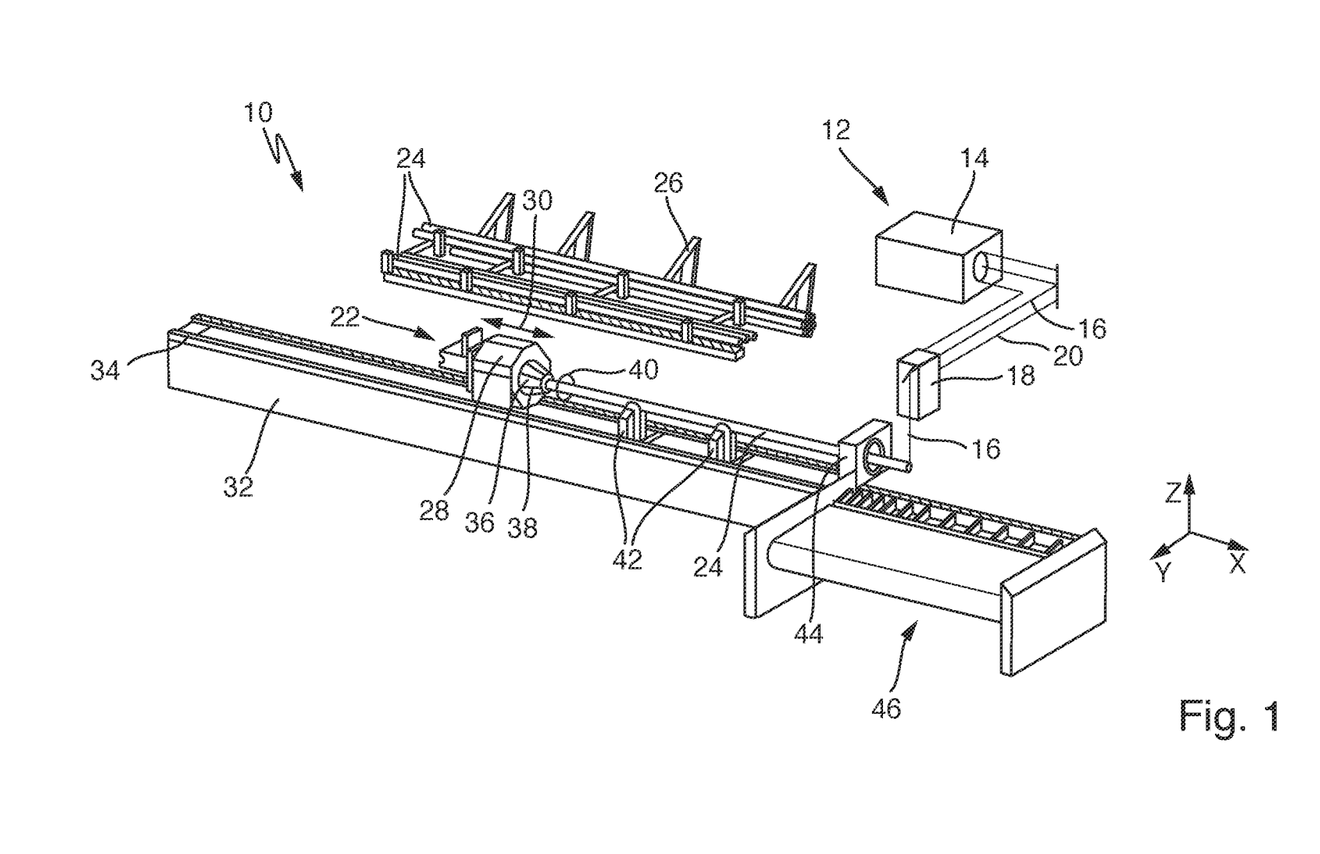
FIG. 1 is a highly schematic and diagrammatic perspective illustration of a system for processing hollow workpieces.

Referring now to the figures of the drawings in detail and first, particularly, to FIG. 1 thereof, there is seen, in schematically simplified form, a system for processing hollow workpieces, which system is denoted as a whole by the reference designation 10.

The system 10 firstly includes a laser processing machine 12. The laser processing machine 12 includes a laser beam source 14 for generating a laser beam 16, a laser cutting head 18, and a beam guide 20 that guides the laser beam 16 from the laser beam source 14 to the laser cutting head 18.

The system 10 furthermore includes a supply device 22 for laterally supplying a workpiece 24 that is to be processed, in particular to be cut, by the laser processing machine 12 using the generated laser beam 16. The supply device 22 includes a holding device 28 for holding and displacing a workpiece 24 in such a way that the latter can be subjected to laser cutting. The holding device 28 is motor-driven and is displaceable back and forth in a feed direction (X direction) 30. The supply device 22 furthermore includes a machine bed 32 with guide rails 34 on which the holding device 28 is displaceably disposed. The holding device 28 furthermore has a clamping chuck 36 with clamping jaws 38. The clamping chuck 36 serves for holding the workpiece 24. Here, the clamping chuck 36 is rotatable, as indicated by the double arrow 40, in order to rotate a clamped workpiece 24. The supply device 22 furthermore includes a workpiece support 42 which is disposed on the machine bed 32 and which serves for supporting the workpiece 24. Finally, the supply device 22 includes a push-through chuck 44 through which the workpiece 24 is supplied to the laser processing machine 12. The push-through chuck 44 likewise has clamping jaws.

The system 10 furthermore includes an unloading device 46 in order to discharge a workpiece part that has been processed by using the laser processing machine 12.

The system 10 furthermore includes a loading station 26 for storing hollow workpieces 24 and for separating these out and guiding them to the supply device 22. Embodiments of the loading station 26 will be described in more detail further below on the basis of FIGS. 4 to 6.

Figure 2:
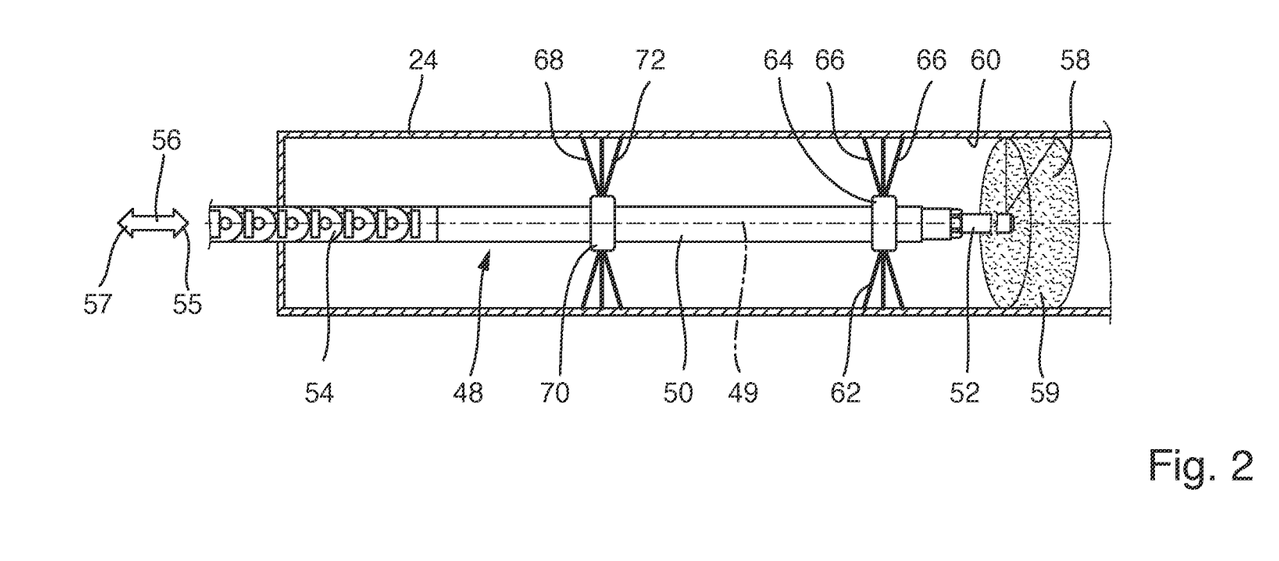
FIG. 2 is a schematic cross section through a hollow workpiece with, introduced therein, an introduction section of an apparatus for introducing parting agent into the workpiece.

FIG. 2 shows, at the reference designation 48, a part of an apparatus for introducing parting agent into a hollow workpiece 24. The apparatus 48 includes an introduction section 49 including a guide rod 50. At its free end, the guide rod 50 has a nozzle 52 in the form of an annular jet nozzle. At the opposite end of the guide rod 50, the guide rod 50 is adjoined by an energy chain 54. Compressed air and parting agent 58 can be conducted in separate lines to the nozzle 52 through the energy chain 54. The provision of a third line with control air for controlling the nozzle 52 is also conceivable. The guide rod 50 is displaceable axially, as indicated by the double arrow 56, in the workpiece 24 in an introduction direction 55 and an opposite direction 57 in order to dispense parting agent 58 onto the inner side 60 of the workpiece 24, as is schematically indicated by the region denoted by the reference designation 59. In order to dispense parting agent 58, the guide rod 50 is firstly introduced into the workpiece 24.

It would be conceivable, when a workpiece 24 is disposed in the supply device 22, for the apparatus 48 to be introduced into the workpiece 24 from one of the two workpiece ends. It would however be conceivable in particular for the apparatus 48 to be introduced into a workpiece 24 in the region of the loading station 26. It would be conceivable for the apparatus 48 to be mounted on a carriage and to be moved to a workpiece 24 for example in a bundle magazine of the loading station 26 in order to wet the workpiece 24 with parting agent 58. Here, a workpiece 24 could also be wetted with parting agent 58 outside the loading station 26 on a mount or at a preparation station. It would however be conceivable in particular for the apparatus 48 to be disposed at the loading station 26 and to thus also be a part of the loading station 26, as will be presented in more detail below on the basis of FIGS. 4 to 6.

A centering element 62 is disposed on the guide rod 50 in front of the nozzle 52 in an introduction direction 55. The centering element 62 includes a brush body 64 on which a number of centering brush fibers 66 are disposed.

Disposed so as to be spaced apart from the centering element 62 and in front of the latter in an introduction direction 55 is a stabilization element 68, which is of the same structural configuration as the centering element 62 and consequently includes a stabilization body 70 and stabilization brush fibers 72 disposed thereon. Here, the centering element 62 serves for centering the guide rod 50, in particular the nozzle 52 of the guide rod 50, in the workpiece 24, in such a way that the nozzle 52 is held in a centered manner substantially in the middle of a hollow workpiece 24 (see FIGS. 3a to 3c). During the introduction into the workpiece, the centering brush fibers 66 can elastically deform, in such a way that centering can take place. Due to the elastic deformation, centering can be provided in the case of a wide variety of workpiece diameters. The stabilization element 70 ensures that the guide rod 50 does not tilt in the workpiece 24, in such a way that particularly advantageous stabilized centering of the nozzle 52 in the workpiece 24 can be provided. Here, too, the stabilization brush fibers 72 can elastically deform during the introduction into the workpiece 24.

Figure 3A:
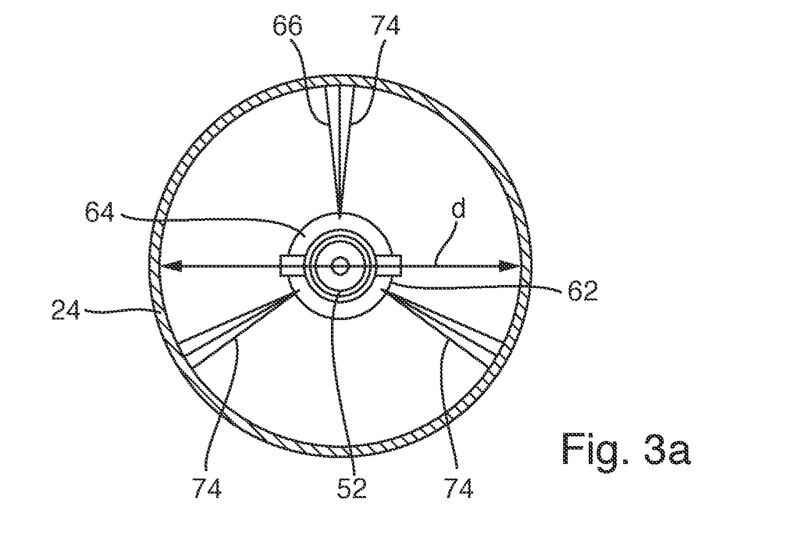
FIG. 3a shows a schematic plan view of a tubular workpiece with introduction section introduced therein.

FIG. 3a shows an embodiment of the centering element 62. Here, three centering brush fiber bundles 74 which are disposed at intervals of 120° with respect to one another are provided on the centering body 64 in order to hold the nozzle 52 in a centered manner in a workpiece 24. The workpiece 24 is of circular cylindrical form. The centering brush fibers 66 can elastically deform during the introduction into the workpiece 24 and can thus provide centering of the nozzle 52 in the workpiece 24 in the case of a wide variety of workpiece diameters (in this case pipe diameters) d.

Figure 3B:
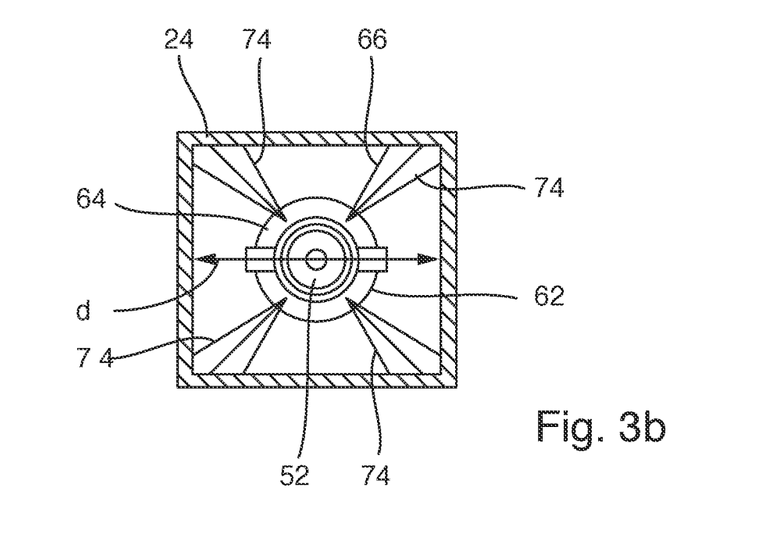
FIG. 3b shows a schematic plan view of a square workpiece with introduction section introduced therein.
Figure 3C:
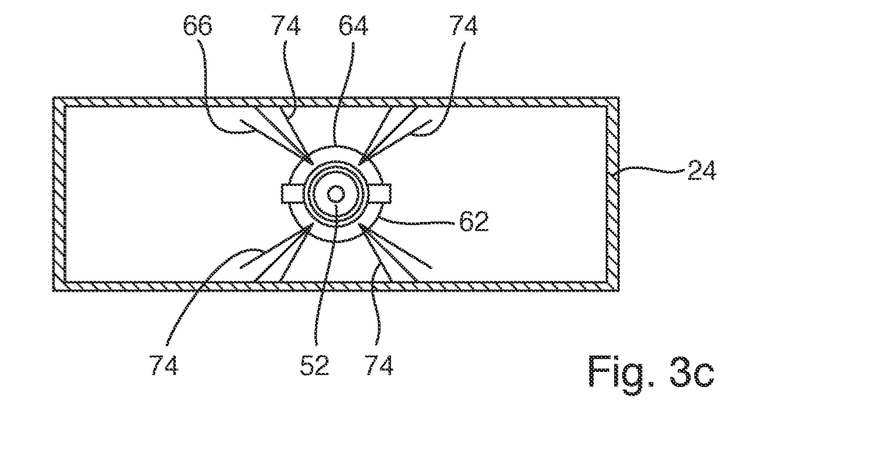
FIG. 3c shows a schematic plan view of a rectangular workpiece with introduction section introduced therein.

FIG. 3b shows four brush fiber bundles 74 which are disposed at intervals of 90° with respect to one another, wherein the workpiece 24 in this case has a square contour. Here, too, due to the elastic deformability of the centering brush fibers 66, centering can be provided in the case of a wide variety of diameters d of the workpiece 24. Finally, FIG. 3c shows the centering element 52 as per FIG. 3b introduced into a rectangular workpiece 24, wherein centered stabilization in the middle can be provided in this case too.

Figure 4A:
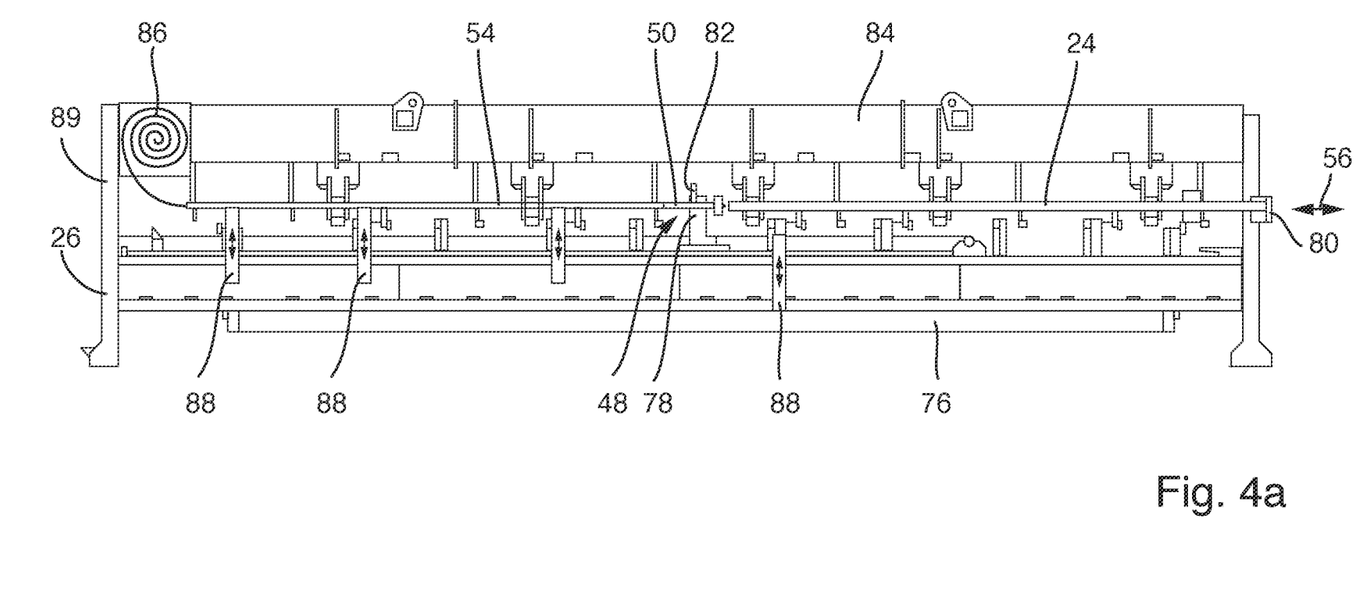
FIG. 4a is a schematic illustration of a loading station including an apparatus for introducing parting agent according to a first embodiment.
Figure 4B:
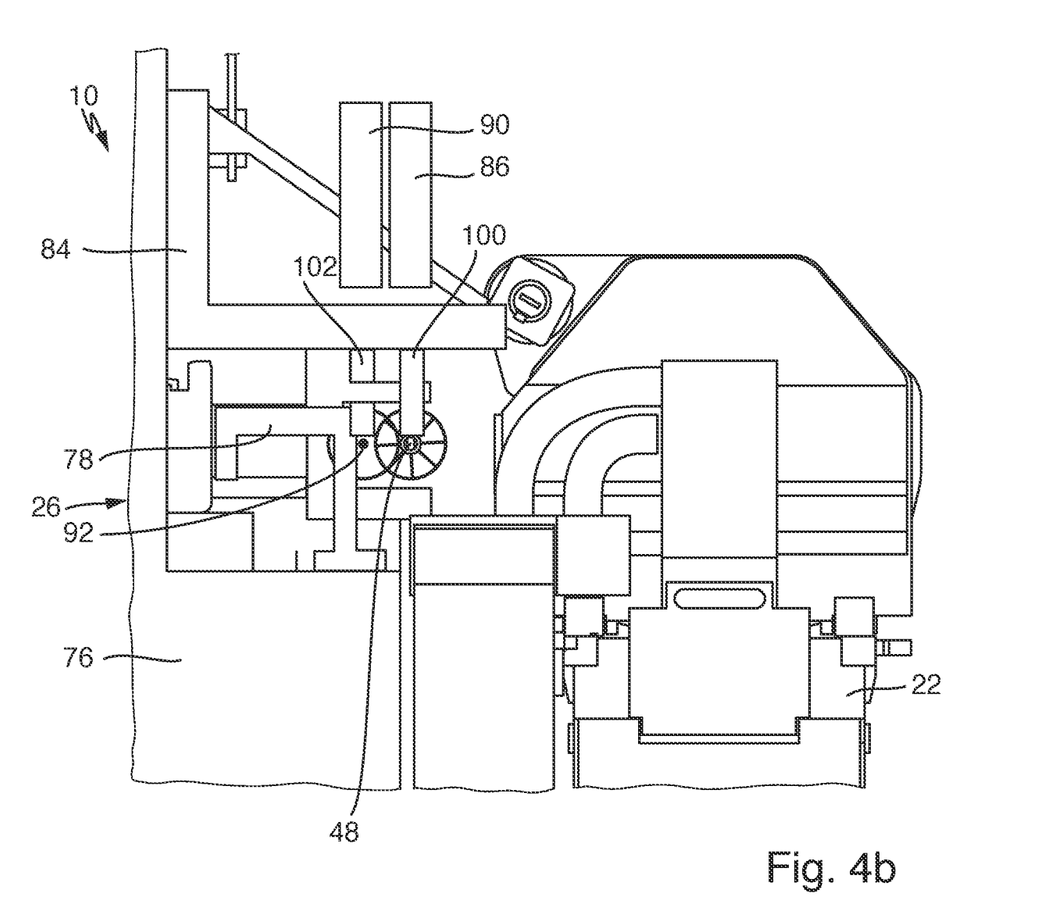
Figure 4C:
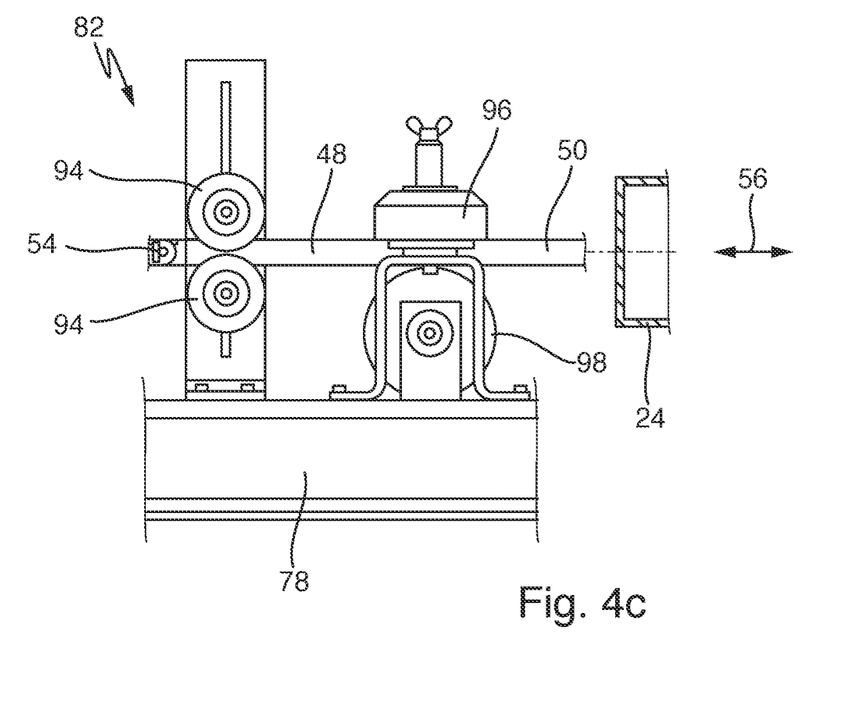
Figure 5A:
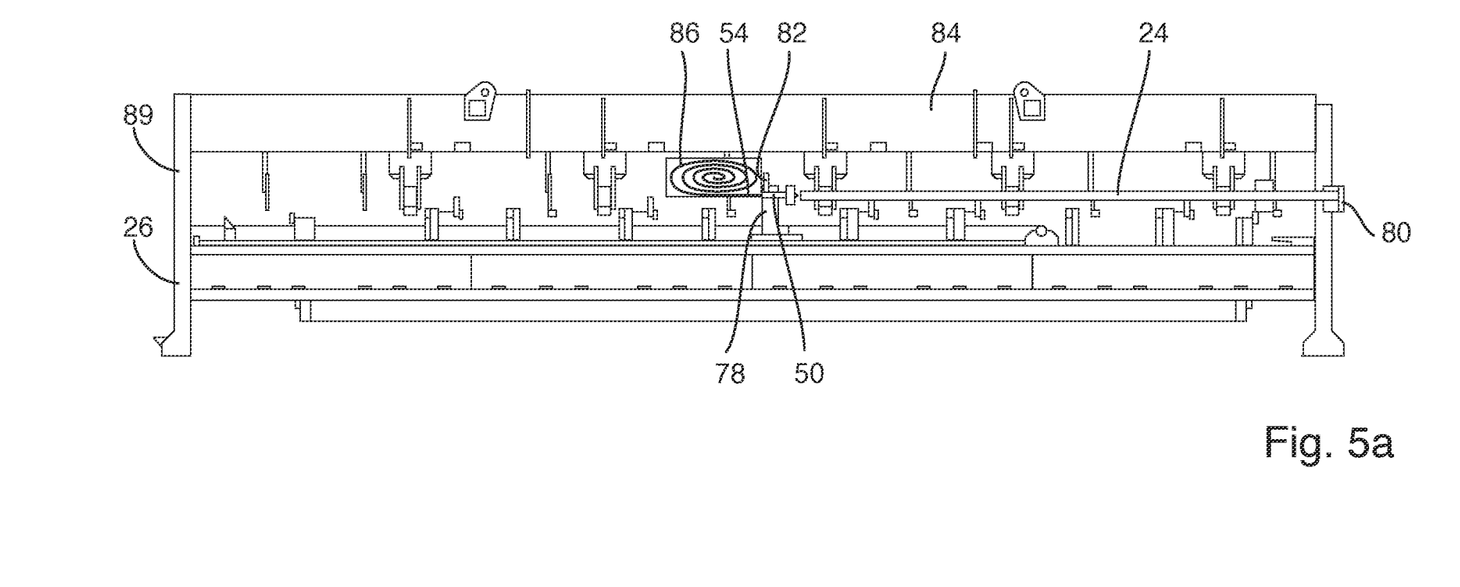
FIG. 5a is a schematic illustration of a loading station with an apparatus for introducing parting agent according to a second embodiment.
Figure 5B:
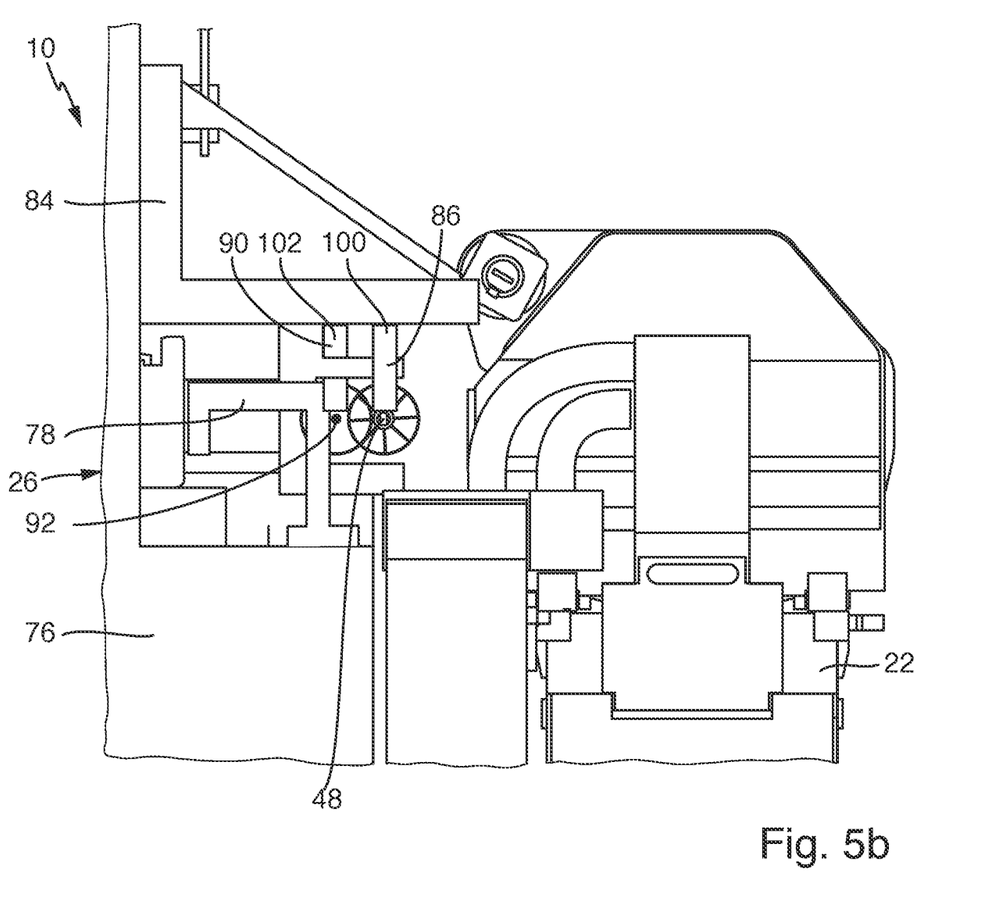
Figure 6A:
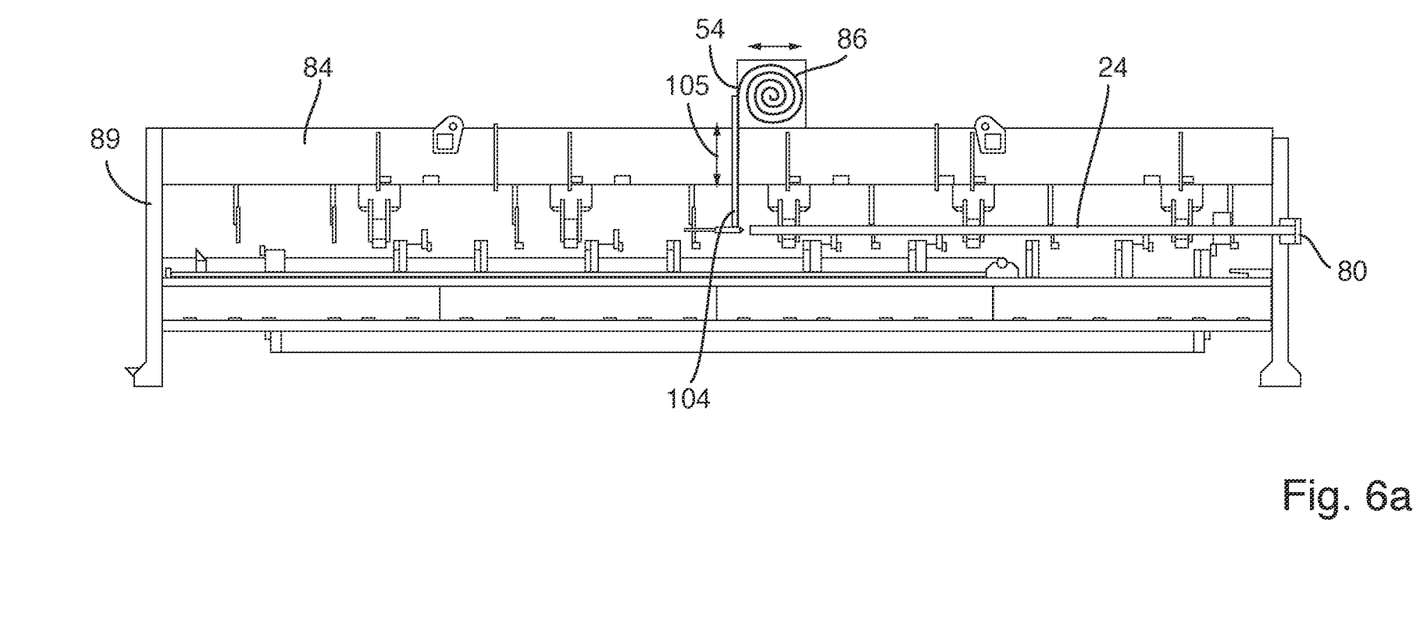
FIG. 6a is a schematic illustration of a loading station having an apparatus for introducing parting agent according to a third embodiment.
Figure 6B:
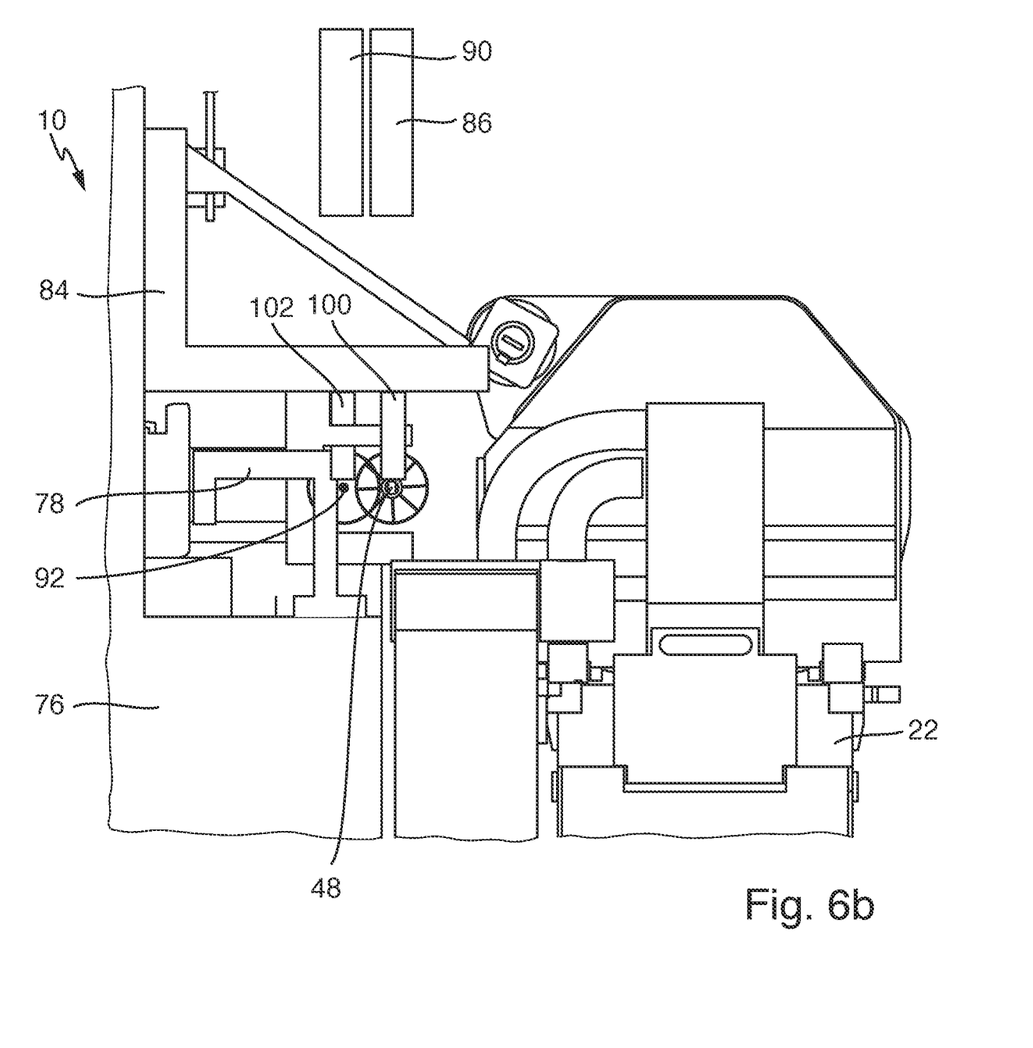

A specific implementation of the apparatus 48 will now be presented on the basis of three embodiments as per FIGS. 4 to 6:

FIGS. 4a and 4b show the loading station 26 of the system 10. Here, the loading station 26 includes a separating device 76 for separating out a workpiece 24 from a bundle magazine which is not shown. Since the workpieces 24 have different pipe lengths, the workpiece 24 can be displaced in an axial direction 56. This is performed by using a sliding gauge 78, which is consequently constructed for displacing a workpiece 24. Here, the sliding gauge 78 displaces the workpiece 24 until the latter abuts against a stop 80. The length of the workpiece 24 can then be determined. Disposed on the sliding gauge 78 is an introduction device 82, which will be discussed in more detail further below on the basis of FIG. 4c. The loading station 26 furthermore includes a gripping device 84 for supplying a separated-out workpiece 24 to the supply device 22 of the system 10 (see FIG. 1). The loading station 26 includes the apparatus 48. Here, in a left-hand upper end region of the loading station 26 as shown in FIG. 4a, a chain drum 86 for the rolling-up of the energy chain 54 is disposed on the machine frame 89 of the loading station 26. Furthermore, a number of support elements 88 are provided in order to support the energy chain 54 in accordance with the length of the workpiece 24. As can be seen in FIG. 4b, a hose drum 90 is also disposed adjacent to the chain drum 86. An introduction hose 92 can be wound up onto the hose drum.

As can be seen in FIG. 4c, the introduction device 82 firstly includes two guide rollers 94 for supplying the guide rod 50 to the workpiece 24. Furthermore, a bracing roller 96 is provided in order to push the guide rod 50 against the drive roller 98. The drive roller 98 is driven by a motor 100, which is shown in FIG. 4b, in order to introduce the guide rod 50 to the workpiece 24. Furthermore, on the sliding gauge 78, it is also possible to see a motor 102, which is visible in FIG. 4b, for alternatively introducing the introduction hose 92 into the workpiece 24.

Altogether, the system 10 then functions as follows:

Before a workpiece 24 is supplied to the laser cutting machine 12, parting agent 58 is applied to the inside 60 of the workpiece 24 in the loading station 26 in order to reduce the adhesion of cutting fragments, which form during the process, to the inside 60 of the workpiece 24. For this purpose, the guide rod 50 is inserted with the nozzle 52 into the workpiece 24 by using the introduction device 82 (see FIG. 2). Here, the centering brush fibers 66 and the stabilization brush fibers 72 can elastically deform in order to hold the guide rod 50 in a centered manner in the workpiece 24. The parting agent 58 can then be dispensed along the inner side 60 of the workpiece 24. Here, the nozzle 52 can for example be displaced in a withdrawal direction 57 from one workpiece end to the other workpiece end in order to thus gradually wet the entirety of the inside 60 of the workpiece with parting agent.

Here, for the introduction of the guide rod 50, the sliding gauge 78 is displaced until the workpiece 24 arrives at the stop 80. In the process, the energy chain 54 is unrolled from the chain drum 86. Then, as soon as the sliding gauge 78 has moved the workpiece 24 to the stop 80, the guide rod 50 can be introduced into the workpiece 24 by using the introduction unit 82.

After the inside 60 of the workpiece 24 has been wetted with parting agent 58, the workpiece can be supplied by using the gripping device 84 to the laser processing machine 12 for the purposes of laser processing, in particular for the purposes of laser cutting.

In the case of small pipe diameters, for example between 20 mm and 70 mm, it is also possible for the introduction hose 92 instead of the guide rod 50 to be introduced into the workpiece 24. Consequently, depending on the pipe diameter, it is possible on the one hand for the guide rod 50 to be introduced, wherein the centering element 62 and the stabilization element 68 hold the guide rod 50 in a centered manner in the workpiece 24. By contrast, in the case of relatively small pipe diameters, it is also possible for the introduction hose 92 to be introduced without the need for further centering or stabilization elements, wherein sufficient quality of wetting with parting agent 58 can nevertheless be achieved.

The embodiment as per FIGS. 5a and 5b shows an alternative embodiment. Here, the chain drum 86 is fastened to the sliding gauge 78 and is displaced together therewith. In this case, it is possible in particular for the support devices 88 for supporting the energy chain 54 to be omitted.

FIG. 6 shows a further alternative embodiment. Here, the chain drum 86 is displaceable axially on the machine frame 89 of the loading station 26. A vertically extending arm 104 is coupled in terms of motion to the chain drum 86. Here, the arm is displaceable in a vertical direction 105. The motor 100 together with the introduction device 82 (not shown in any more detail) is provided at the lower end of the vertical arm 104 in order to introduce the guide rod 50 into a workpiece 24. The hose drum 90 may also be disposed in similarly axially displaceable fashion. Finally, the motor 102 for the introduction of the hose may be disposed similarly on the arm 104.

The invention claimed is:

1. An apparatus for introducing a parting agent into a hollow workpiece before or during processing of the hollow workpiece by using a laser processing machine, the apparatus comprising:
    an introduction section with a nozzle for dispensing the parting agent; and
    a centering element disposed on said introduction section, said centering element serving for centering said introduction section within the hollow workpiece equidistant from mutually opposite wall surfaces of the hollow workpiece;
    said centering element being formed of a plurality of at least three separate bundles of elastically deformable brush fibers, with said bundles being rotationally symmetrically distributed about said centering element and spaced from one another by an angular offset of 120° or 90° in a circumferential direction and leaving empty spaces between said bundles in the circumferential direction, and with said brush fibers bracing against the mutually opposite wall surfaces of the hollow workpiece when said introduction section is inserted in the hollow workpiece.

2. The apparatus according to claim 1, wherein each of said bundles of said centering element includes a plurality of centering brush fibers.

3. The apparatus according to claim 1, wherein said introduction section includes a guide rod having a free end at which said nozzle is disposed, and said centering element is disposed on said guide rod.

4. The apparatus according to claim 3, which further comprises a stabilization element provided on said guide rod, in addition to said centering element, for preventing tilting of said guide rod in the hollow workpiece.

5. The apparatus according to claim 1, which further comprises an introduction hose with a nozzle for dispensing the parting agent, said introduction hose configured to be introduced into the hollow workpiece instead of said introduction section.

6. The apparatus according to claim 3, which further comprises an energy chain adjoining an end of said guide rod facing away from said free end of said guide rod at which said nozzle is disposed.

7. The apparatus according to claim 6, which further comprises a chain drum for rolling-up said energy chain.

8. The apparatus according to claim 1, which further comprises an introduction device with a drive device for introducing said introduction section into the hollow workpiece.

9. A loading station for storing hollow workpieces and for loading a laser processing machine with the hollow workpieces, the loading station comprising:
    an apparatus according to claim 1 for introducing a parting agent into the hollow workpieces before processing of the hollow workpieces by using the laser processing machine.

10. The loading station according to claim 9, wherein:
    said introduction section includes a guide rod having a free end at which said nozzle is disposed;
    said centering element is disposed on said guide rod;
    an energy chain adjoins an end of said guide rod facing away from said free end of said guide rod at which said nozzle is disposed;
    a chain drum is provided for rolling-up said energy chain;
    an introduction device with a drive device is provided for introducing said introduction section into the hollow workpiece;
    an axially displaceable sliding gauge is provided on which said introduction device is disposed; and
    a machine frame is provided on which said chain drum is disposed in a positionally fixed manner.

11. The loading station according to claim 9, wherein:
    said introduction section includes a guide rod having a free end at which said nozzle is disposed;
    said centering element is disposed on said guide rod;
    an energy chain adjoins an end of said guide rod facing away from said free end of said guide rod at which said nozzle is disposed;
    a chain drum is provided for rolling-up said energy chain;

an introduction device with a drive device is provided for introducing said introduction section into the hollow workpiece; and an axially displaceable sliding gauge is provided on which said chain drum and said introduction device are disposed.

12. The loading station according to claim 9, wherein:

said introduction section includes a guide rod having a free end at which said nozzle is disposed;

said centering element is disposed on said guide rod;

an energy chain adjoins an end of said guide rod facing away from said free end of said guide rod at which said nozzle is disposed;

a chain drum is provided for rolling-up said energy chain;

an introduction device with a drive device is provided for introducing said introduction section into the hollow workpiece;

a machine frame is provided on which said chain drum is disposed in axially displaceable fashion;

an arm is coupled in terms of motion to said chain drum; and said introduction device is disposed on said arm.

13. A system for processing hollow workpieces, the system comprising:

a loading station according to claim 9; and a laser processing machine for laser processing of the hollow workpieces.

14. A method for introducing a parting agent into a hollow workpiece before or during processing of the hollow workpiece by using a laser processing machine, the method comprising:

providing the apparatus according to claim 1 for introducing a parting agent into the hollow workpieces before processing of the hollow workpieces by using a laser processing machine, and using the apparatus for:
  a. introducing the introduction section for dispensing the parting agent into a hollow workpiece, and using the centering element for centering the introduction section within the hollow workpiece; and
  b. dispensing the parting agent in the hollow workpiece through the nozzle.

15. The method according to claim 14, which further comprises:

providing a system including:
  a laser processing machine for laser processing of the hollow workpieces; and
  a loading station for storing hollow workpieces and for loading the laser processing machine with the hollow workpieces, the loading station including the apparatus for introducing a parting agent into the hollow workpieces before processing of the hollow workpieces by using the laser processing machine; and
c. using the laser processing machine for laser processing of the hollow workpiece having been wetted with parting agent.

* * * * *